Feb. 20, 1951  E. R. ORLING  2,542,426
BONING KNIFE
Filed Sept. 12, 1945

INVENTOR.
Ernest R. Orling.
BY
Harness, Dickey & Pierce
ATTORNEYS.

Patented Feb. 20, 1951

2,542,426

UNITED STATES PATENT OFFICE 2,542,426

BONING KNIFE

Ernest R. Orling, Detroit, Mich.; Herbert H. Schoenberg executor of said Ernest R. Orling, deceased Application September 12, 1945, Serial No. 615,728

4 Claims. (Cl. 17—1)

The invention relates generally to the meat processing industry and it has particular relation to devices for removing meat from bones or the like.

In one phase of the meat processing industry, bones are removed from the meat and in this procedure, substantial parts of the meat remain on the bones. It is of considerable importance that the remnants of meat be removed as otherwise a large amount of meat would be wasted, especially in large processing establishments. Removal of the meat remnants usually has been a tedious task, particularly because bones have an irregular contour and also because the meat remnants are constantly varying in size and location.

The present invention is concerned principally with the removal of the meat remnants from bones and it has particular relation to a device which will facilitate this procedure and reduce the cost thereof.

Another object of the invention is to provide a device for removing remnants of meat from bones which will enable the user of the device to easily remove meat from the bones even though the latter are irregular in contour.

Other objects of the invention will become apparent from the following specification, from the drawings relating thereto, and from the claims hereinafter set forth.

For a better understanding of the invention reference may be had to the drawings wherein.

Figure 1:
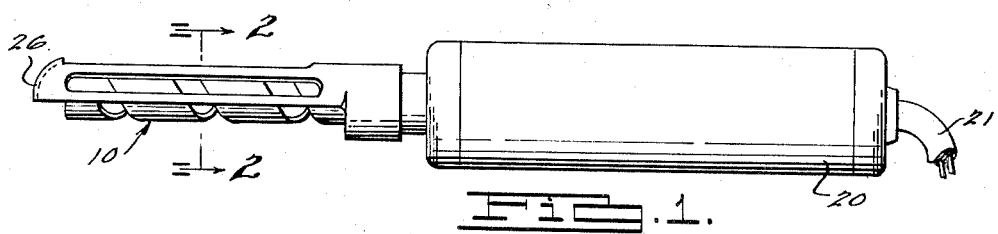
Figure 1 is a side elevational view of a device constructed according to one form of the invention.
Figure 2:
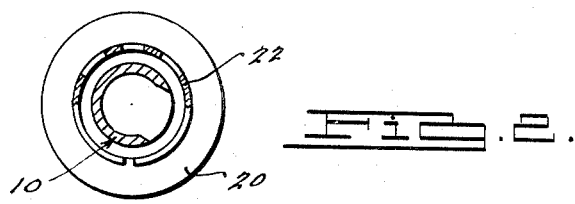
Fig. 2 is a cross-sectional view taken substantially along the line 2—2 of Fig. 1.
Figure 3:
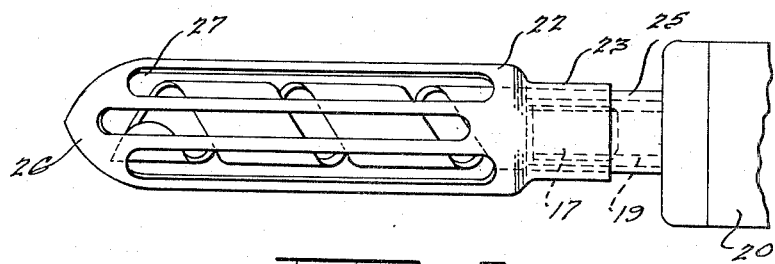
Fig. 3 is a fragmentary plan view of the device shown by Fig. 1.
Figure 4:
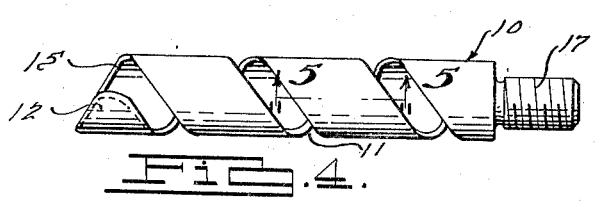
Fig. 4 is a detail view illustrating the boning knife as seen when separated from the other parts of the device; and, Fig. 5 is a cross-sectional view on a slightly larger scale taken substantially along the line 5—5 of Fig. 4.
Figure 5:
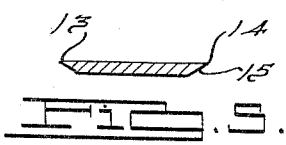

Referring to the drawings, the boning device comprises a rotary knife 10 which is in the form of a helically arranged metal cutting strip. The winding of the strip is of such character that a substantial space 11 is present between turns of the helix and the end of the strip terminates in a rounded end portion 12. Both edges of the strip are sharpened as shown best at 13 and 14 in Fig. 5, and the sharpened edge continues along the rounded end portion 12. Consequently, all edge portions of the strip are sharpened. It might be noted in this connection that the sharpening of the strip is effected by beveling the edge towards the inside of the knife as indicated at 15 and this is desirable since it leaves the outer surface of the strip straight.

The end of the strip opposite the rounded end 12 is rigidly connected to a threaded stub 17 and this stub is threaded into a shaft 19 projecting from an electric motor 20. The threads are of right-hand character so that rotation of the motor shaft will not tend to loosen the connection, and the strip winds in the same direction as the threads so that the edge on the rounded end 12 of the strip will be advancing as the knife rotates.

The device also includes a guard 22 which covers about half of the knife so as to protect the user from being accidentally cut. This guard terminates at its end next to the motor in an annular sleeve portion 23, and this sleeve portion is fastened in any suitable way to a tubular projection 25 secured to the motor casing and projecting over the shaft 19. It might be noted that the guard has a rounded and downwardly turned outer end 26 so as to protect the user from being injured by the end of the knife and it should also be noted that the guard has slots 27 which promote vision and also allow meat particles to pass through the guard if necessary. The motor 20 serves as a handle for the knife and is shown as having an electric cable 21 which may terminate in a plug so that the motor may be connected to any electrical socket.

In using the device the motor is energized and the knife is moved along the bone in either direction and the cutting edges constantly advancing lengthwise of the blade remove meat along the entire length of the blade as the latter rotates. The rounded edge 12 and the end portion of the side cutting edge particularly facilitate removing meat from recesses, depressions, and the like. Attention is directed to the fact that the knife to some extent is resilient which is desirable in certain circumstances.

Although only one form of the invention has been illustrated and described in detail, it will be apparent to those skilled in the art that various modifications may be made without departing from the scope of the claims.

What is claimed is:

1. A boning knife for removing meat from bones or the like comprising a blade having the form of a flat strip helically wrapped about an imaginary cylinder, the distance between adjacent turns of said blade being sufficient to permit portions of meat to project between adjacent turns and said blade being disposed with its thickness or lesser dimension extending radially of said cylinder, said blade having one edge sharpened, and a motor connected to one end of said strip for driving it about the axis of said cylinder.

2. A boning knife for removing meat from bones or the like comprising a blade having the form of a flat strip helically wrapped about an imaginary cylinder, the distance between adjacent turns of said blade being sufficient to permit portions of meat to project between adjacent turns and said blade being disposed with its thickness or lesser dimension extending radially of said cylinder, the width of said blade being greater than said distance between adjacent turns and said blade having one edge sharpened, and a motor connected to one end of said strip for driving it about the axis of said cylinder.

3. A boning knife for removing meat from bones or the like comprising a blade having the form of a flat strip helically wrapped about an imaginary cylinder, the distance between adjacent turns of said blade being sufficient to permit portions of meat to project between adjacent turns and said blade being disposed with its thickness or lesser dimension extending radially of said cylinder, said blade having both edges sharpened, and a motor connected to one end of said blade for driving the latter about the axis of said cylinder, the opposite end of said blade having its end edge rounded and sharpened.

4. A boning knife for removing meat from bones or the like comprising a blade having the form of a flat strip helically wrapped about an imaginary cylinder, the distance between adjacent turns of said blade being sufficient to permit portions of meat to project between adjacent turns and said blade being disposed with its thickness or lesser dimension extending radially of said cylinder, said blade having one edge sharpened, a motor connected to one end of said strip for driving it about the axis of said cylinder, and a generally semi-cylindrical guard mounted in fixed relation to said motor and overlying said blade at one side thereof to prevent inadvertent engagement of an operator's hand with the blade, said guard having openings to facilitate the operator's watching the meat removal and the severed meat particles to pass through the guard.

ERNEST R. ORLING.

REFERENCES CITED

The following references are of record in the file of this patent:

UNITED STATES PATENTS

| Number | Name | Date |
|---|---|---|
| 1,420,943 | Philp | June 27, 1922 |
| 1,591,860 | McGinnis | July 6, 1926 |
| 1,603,061 | Browne | Oct. 12, 1926 |
| 1,951,973 | Haskins | Mar. 20, 1934 |
| 2,026,630 | Harris | Jan. 7, 1936 |
| 2,281,250 | Ruskin | Apr. 28, 1942 |